(12) United States Patent
Lee et al.

(10) Patent No.: US 8,351,692 B2
(45) Date of Patent: Jan. 8, 2013

(54) METHOD, MEDIUM, AND SYSTEM EFFECTIVELY COMPRESSING AND/OR RESTORING BINARY IMAGES

(75) Inventors: Sang-jo Lee, Suwon-si (KR); Si-hwa Lee, Seoul (KR); Do-hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1391 days.

(21) Appl. No.: 12/007,366

(22) Filed: Jan. 9, 2008

(65) Prior Publication Data

US 2008/0175489 A1    Jul. 24, 2008

(30) Foreign Application Priority Data

Jan. 19, 2007    (KR) .................. 10-2007-0006307

(51) Int. Cl.
*G06T 9/00* (2006.01)
(52) U.S. Cl. .................. 382/166; 382/233; 382/243
(58) Field of Classification Search .................. 382/232, 382/233, 253, 243, 166; 375/242, 244
See application file for complete search history.

(56) References Cited

U.S. PATENT DOCUMENTS

| 6,636,266 | B2 * | 10/2003 | Takahashi ............... 348/445 |
| 2002/0136296 | A1 * | 9/2002 | Stone et al. ............ 375/240.03 |
| 2007/0013953 | A1 | 1/2007 | Yamamoto |
| 2007/0071333 | A1 * | 3/2007 | Strom et al. ................ 382/239 |

FOREIGN PATENT DOCUMENTS

| JP | 10-023272 | 1/1998 |
| JP | 2000-069298 | 3/2000 |
| JP | 2004-504781 | 2/2004 |
| KR | 10-2000-0061188 | 10/2000 |
| KR | 10-2002-0061188 | 7/2002 |
| KR | 1020080016110 | 2/2008 |
| KR | 1020080049535 | 6/2008 |
| WO | 98/02660 | 6/1998 |
| WO | WO 02/07447 | 1/2002 |

OTHER PUBLICATIONS

Chan et al. "Visual Pattern BTC With Two Principle Colors for Color Images." IEEE International Symposium on Circuits and Systems, vol. 1, Apr. 30, 1995, pp. 235-238.*
Franti et al. "Block Truncation Coding with Entropy Coding." IEEE Transactions on Communications, vol. 43, No. 2/3/4, Feb. 1995, pp. 1677-1685.*
Someya J. et al: "The Suppression of Noise on a Dithering Image in LCD Overdrive", IEEE Transactions on Consumer Electronics, vol. 52, No. 4, Nov. 1, 2006, pp. 1325-1332.

(Continued)

*Primary Examiner* — Jon Chang
(74) *Attorney, Agent, or Firm* — Staas & Halsey LLP

(57) ABSTRACT

A method, medium, and system effectively compressing and/or restoring binary images. By compressing pixel values making up a 2×2 block in an input image, using representative values representing the pixel values and a pattern of the pixel values represented by the representative values, it is possible to effectively compress and/or restore binary images having little similarities between pixel values. In addition, by extracting compressed values and a pattern of pixel values making up a 2×2 block in an image, from compressed data of the 2×2 block, and restoring pixel values using the compressed values and the pattern, it is possible to effectively restore binary images.

25 Claims, 9 Drawing Sheets

OTHER PUBLICATIONS

B. V. Dasarathy: "Image Data Compression: Block Truncation Coding", Jun. 1, 1995, IEEE Computer Society Press, Los Alamitos, CA, US, XP002636164.

European Search Report mailed Jun. 28, 2011 corresponds to European Application No. 08150220.5-1247.

Wu Yiyan et al., "Single Bit-Map Block Truncation Coding of Color Images", IEEE Journal on Selected Areas in Communications, vol. 10, No. 5, Jun. 1, 1992, pp. 952-959, IEEE Service Center, Piscataway, US.

Wu Yiyan et al., "Multilevel Block Truncation Coding Using a Minimax Error Criterion for high-Fidelity Compression of Digital Images", IEEE Transactions on Communications, vol. 40, No. 8, Aug. 1, 1993, pp. 1179-1191, IEEE Service Center, Piscataway, NJ. USA.

B. C. Dhara et al., "Block Truncation Coding Using Pattern Fitting", Pattern Recognition, vol. 37, No. 11, Nov. 1, 2004, pp. 2131-2139, XP004526623, Elsevier, GB.

P. Franti et al., "Block Truncation Coding With Entropy Coding", IEEE Transactions on Communications, vol. 43, No. 2/04, part 03, Feb. 1, 1995, pp. 1677-1685, IEEE Service Center, Piscataway, N.J. USA.

E. J. Delp et al., "Image Compression Using Block Truncation Coding", IEEE Transactions on Communication, vol. Com-27, No. 9, Sep. 1, 1979, pp. 1335, 1342, IEEE Service Center, Piscataway, NJ. USA.

M. K. Quweider et al., "Gradient-Based block Truncated Coding", Electronics Letters, vol. 31, No. 5, Mar. 2, 1995, pp. 353-355, IEE Stevenage, GB.

Extended European Search report dated Oct. 21, 2011 corresponds to European Patent Application No. 08150220.5-1247.

Chinese Office Action issued Nov. 30, 2010 corresponds to Chinese Patent Office Application No. 200810003093.8.

Japanese Office Action dated May 22, 2012, from Japanese Patent Application 2008-009255.

"Coding of Still Pictures," Bi Houjie, Journal of China Institute of Communications, vol. 14, Issue 2, pp. 48-54, Mar. 1993.

Chinese Office Action from Chinese Patent Application 200810003093.8 dated May 3, 2012.

* cited by examiner

| 51 | 52 |
|---|---|
| 0   100 <br> 100   100 | 100   102 <br> 0   2 |

| 61 | 62 |
|---|---|
| 0   100 <br> 100   0 | 5   100 <br> 100   5 |

METHOD, MEDIUM, AND SYSTEM EFFECTIVELY COMPRESSING AND/OR RESTORING BINARY IMAGES

CROSS-REFERENCE TO RELATED APPLICATIONS

This application claims the benefit of Korean Patent Application No. 10-2007-0006307, filed on Jan. 19, 2007, in the Korean Intellectual Property Office, the disclosure of which is incorporated herein in its entirety by reference.

BACKGROUND

1. Field

One or more embodiments of the present invention relates to a method, medium, and system compressing images, and more particularly, to method, medium, and system effectively compressing and/or restoring binary images.

2. Description of the Related Art

Existing image compression techniques, such as H.264, JPEG-LS, and JPEG standards, utilize a basic principle of removing similarities between pixel values constructing an image. This basic principle can be applied to a variety of images, but cannot be applied to some portions of natural images or synthetic images, such as test patterns, where little similarity exists between pixels. In particular, a representative image in which such minimal similarity exists between pixel values is a binary image, where each pixel has only two values.

FIG. 1 illustrates two samples of the variety in binary images.

Referring to FIG. 1, the image 11 of FIG. 1 has two available values, while the image 12 of FIG. 1 further shows binary areas having two respective groups of binary pixel values, each respective group having slightly different values. If existing image compression methods are applied to each of the binary areas, compression efficiency and the resultant picture-quality of restored images deteriorates significantly since such similarities between pixel values cannot be utilized.

SUMMARY

One or more embodiments of the present invention includes a method, medium, and system effectively compressing and/or restoring binary images.

One or more embodiments of the present invention also includes a method, medium, and system effectively compressing and/or restoring a variety of images other than binary images.

Additional aspects and/or advantages will be set forth in part in the description which follows and, in part, will be apparent from the description, or may be learned by practice of the invention.

To achieve the above and/or other aspects and advantages, embodiments of the present invention include an image compression method, including identifying representative values of pixel values making up a block having a predetermined size in an image, identifying a pattern of the pixel values, as represented by the representative values, and compressing the pixel values using the representative values and the pattern.

To achieve the above and/or other aspects and advantages, embodiments of the present invention include an image compression method, including compressing pixel values making up a block having a predetermined size in an image according to a plurality of predetermined image compression techniques, compressing the pixel values using representative values of the pixel values and a pattern of the pixel values, as represented by the representative values, selecting a mode from among a plurality of modes corresponding to the plurality of predetermined image compression techniques and a resultant image compression technique used in the compressing of the pixel values using the representative values based on a comparison of compressed results of the plurality of predetermined image compression techniques and the resultant image compression technique used in the compressing of the pixel values using the representative values, and generating a bit stream packet including mode data representing the selected mode, and compressed data, corresponding to the selected mode representing an indication of one of the compressed results of the plurality of predetermined image compression techniques and the resultant image compression technique used in the compressing of the pixel values using the representative values.

To achieve the above and/or other aspects and advantages, embodiments of the present invention include an image restoring method, including extracting compressed values of pixel values making up a block having a predetermined size in an image embedded in compressed data of the block, extracting a pattern of the pixel values embedded in the compressed data, and restoring the pixel values using the compressed values and the pattern.

To achieve the above and/or other aspects and advantages, embodiments of the present invention include an image restoring method, including extracting mode data and compressed data of a block having a predetermined size in an image from a bit stream packet, recognizing a mode indicating an image compression technique corresponding to the compressed data used to compress the compressed data, from among a plurality of image compression techniques, from the mode data, and selectively restoring pixel values making up the block corresponding to the compressed data using compressed values of the pixel values making up the block and a pattern of the pixel values extracted from the compressed data, according to the recognized mode.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
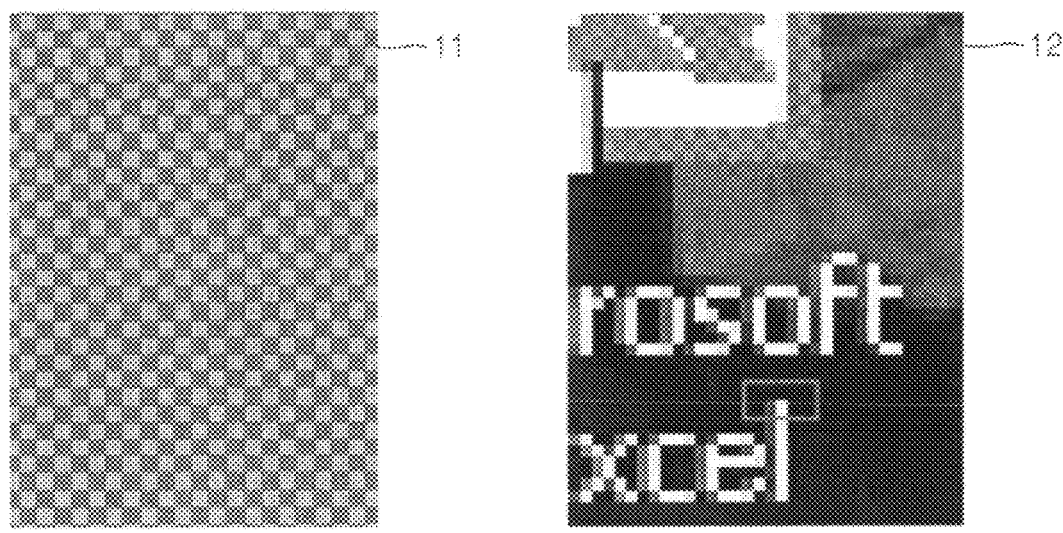
FIG. 1 illustrates two samples of binary images.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 2:
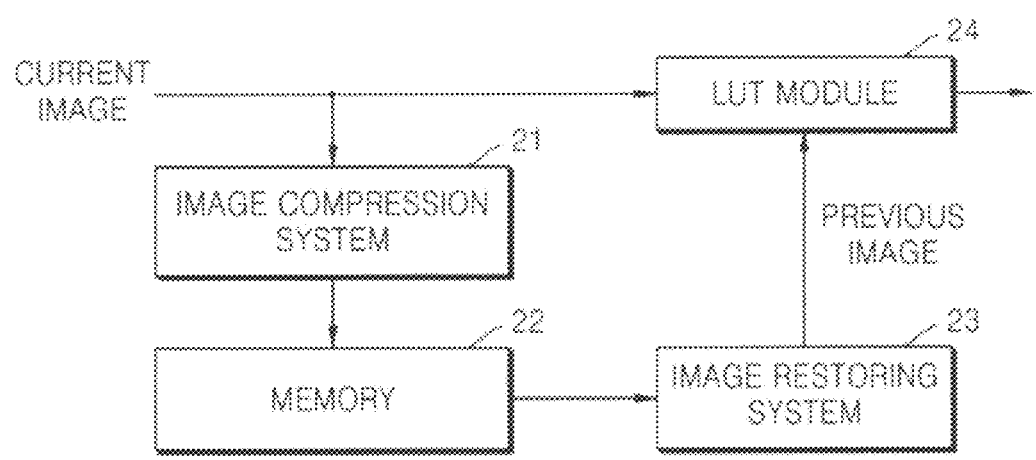
FIG. 2 illustrates a Liquid Crystal Display Dynamic Capacitance Compensation (LCD DCC) system, according to an embodiment of the present invention.

FIG. 2 illustrates a Liquid Crystal Display Dynamic Capacitance Compensation (LCD DCC) system, according to an embodiment of the present invention.

Referring to FIG. 2, the LCD DCC system may include an image compression system 21, a memory 22, an image restoring system 23, and a Lookup Table (LUT) module 24, for example. The LCD DCC system may selectively apply a voltage higher than a voltage typically required for driving pixels of a Thin Film Transistor (TFT)-LCD panel to the pixels in order to improve a response time of the TFT-LCD panel.

Accordingly, the image compression system 21 may compress an input image, shown in FIG. 2 as a "current image", selectively using one of a variety of image compression methods, such as a Differential Pulse Code Modulation (DPCM) method, a Pulse Code Modulation (PCM) method, a transformation method, a binary DPCM method, or a binary PCM method, e.g., for subsequent use in such an improvement of LCD DCC response time.

The memory 22 can further be used to store data compressed by the data compression system 21. Accordingly, when an input image is received, compressed data corresponding to a previous image may already be stored in the memory 22.

The image restoring system 23 may thus restore the previous images stored in the memory 22, selectively using one of a variety of image compression methods, such as the DPCM method, the PCM method, the transformation method, the binary DPCM method, or the binary PCM method.

The LUT module 24 may then predict a voltage value required for achieving a target response time of the TFT-LCD panel, with reference to a lookup table stored therein. In more detail, the LUT module 24 may obtain voltage value information corresponding to a difference between the brightness value of a pixel of a current input image and the brightness value of the corresponding pixel of the previous image restored by the data restoring system 23, from the lookup table, and predict a voltage value required for achieving the target response time of the TFT-LCD panel, using the voltage value information and the target response time of the TFT-LCD panel.

As described above, in order to predict a voltage value desired for achieving a target response time of a TFT-LCD panel, previous images or pixel information may have to be stored in the memory 22. However, the memory 22 may also have a fixed capacity. Accordingly, an image compression system 21 and the image restoring system 23, according to one or more embodiments of the present invention, may accurately obtain a picture-based Constant Bit Rate (CBR) required by a LCD DCC system/device, while improving compression efficiency of edge areas and picture-quality of restored images.

In addition, the image compression system 21 and the image restoring system 24 may be widely applied as a part of a variety of image compression fields requiring low complexity and subjective lossless picture quality, as well as in such an LCD DCC device as illustrated in FIG. 2. For example, the image compression system 21 and the image restoring system 24 may be applied as a system for image compression for Display Driver ICs (DDIs), reference picture compression for video encoder/decoder systems, etc.

Figure 3:
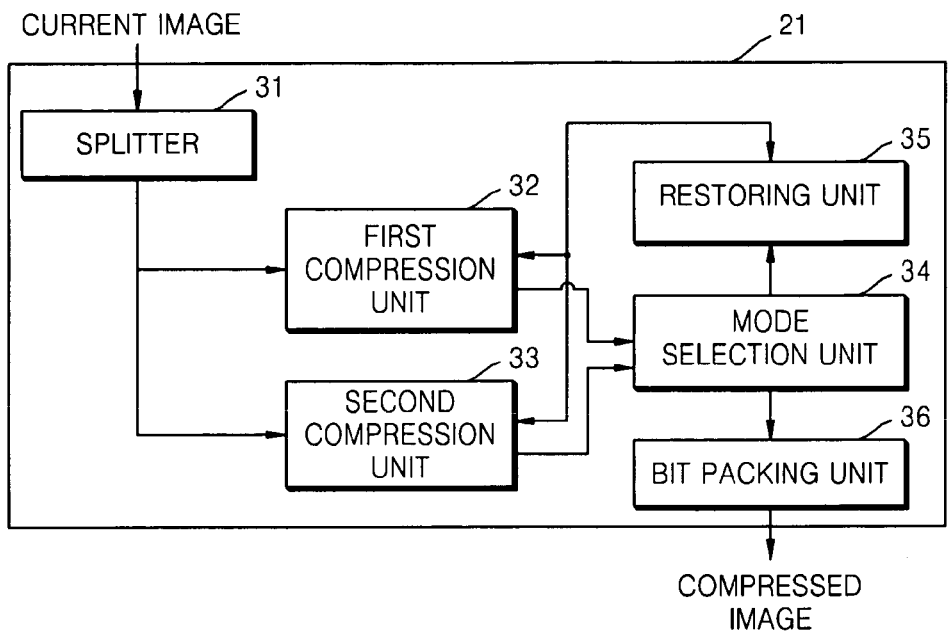
FIG. 3 illustrates an image compression system, such as that illustrated in FIG. 2, according to an embodiment of the present invention.

FIG. 3 illustrates an image compression system 21, such as that illustrated in FIG. 2, according to an embodiment of the present invention.

Referring to FIG. 3, the image compression system 21 may include a splitter 31, a first compression unit 32, a second compression unit 33, a mode selection unit 34, a restoring unit 35, and a bit packing unit 36, for example. The image compression system 21 may further include fewer or additional components such as a unit for performing entropy-encoding to further improve an image compression rate, other than the above-mentioned components.

The splitter 31 may receive an input image, illustrated as the "current image", " ", divide the input image into a plurality of 2×2 blocks, each 2×2 block made up of a set of four pixels, and output each 2×2 block to both the first compression unit 32 and the second compression unit 33. Here, the input image may be referred to with different terms, such as a input picture, a input frame, etc.

In an embodiment, the example 2×2 block has four pixel values, for each color component of the input image. Since a pixel value corresponding to a color component may be 8 bits, for example, the number of pixels included in such a 2×2 block may be 4, and color components of an image may be R, G, and B components, the 2×2 block could thus be represented by 96 bits (=8×4×3). Specifically, in describing an embodiment, each 2×2 block output to the first compression unit 32 and the second compression unit 33 will be referred to as an "input block", below, noting that alternatives are equally available.

The first compression unit 32 may, thus, compress the four pixel values making up the input block, e.g., as divided by the splitter 31, selectively according to the DPCM method, the PCM method, and the transformation method, for example. In more detail, the first compression unit 32 may shift the four pixel values making up the input block and four pixel values making up a reference block corresponding to the input block, by the number of bits corresponding to a corresponding mode, in a direction to the right, of multiple potential modes of such a DPCM compression method, and predict differences between the shifted four pixel values of the input block and the shifted pixel values of the reference block, thereby compressing the four pixel values making up the input block. Here, the different modes refer to different available shifting techniques for the shifting of the input block and the reference block; there may be multiple such DPCM modes. In addition, the first compression unit 32 may merely truncate a portion of the four pixel values making up the input block, thereby compressing the four pixel values making up the input block, according to the PCM method. Still further, the first compression unit 32 may compress the four pixel values making up the input block using DCT transformation, etc., according to the transformation method. In general, here, the mentioned reference block may be the stored previous block corresponding to the input block, e.g., previous in time for a same or similar pixel position illumination; however, it may also be a different neighboring block to the input block.

Such DPCM and PCM methods are described in greater detail in Korean Patent applications Nos. 2006-0077776 and 2006-0120191, with such a transformation method being described in greater detail in the existing Joint Photographic Experts Group (JPEG) standard. Herein, for convenience of explanation, the term "PCM method" will be used to represent a technical concept that is opposite or different to the above-described DPCM method, noting that this PCM method may also be different from a general PCM method of converting analog signals into digital signals. Specifically, the PCM method could be referred to through a different term, such as a truncation compression method, etc. However, as set forth in one or embodiments of the present invention, the additional below-mentioned binary DPCM method and the binary PCM are further different and first described in the present disclosure.

Figure 4:
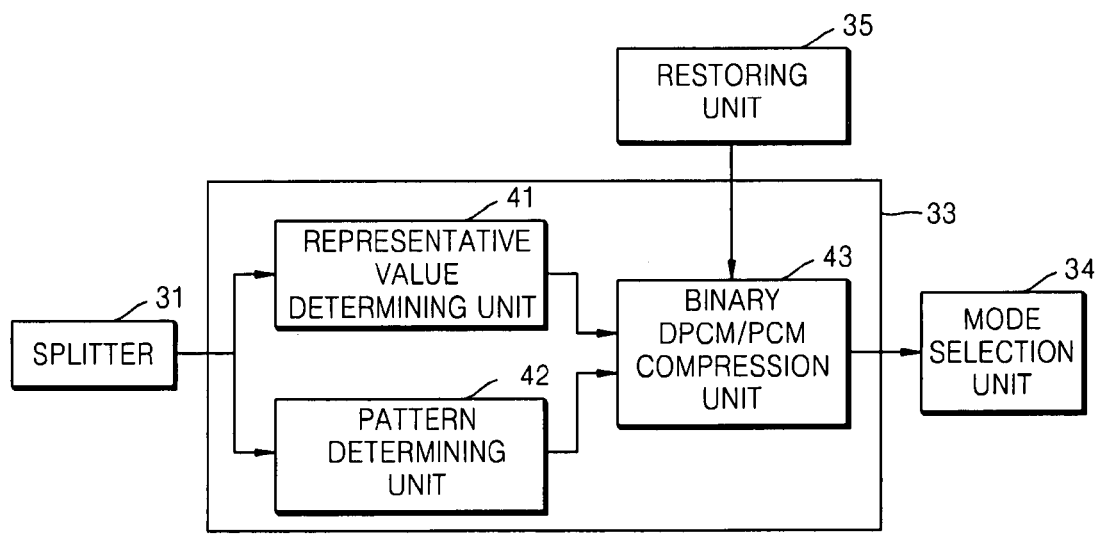
FIG. 4 illustrates a second compression unit, such as that illustrated in FIG. 3, according to an embodiment of the present invention.

The second compression unit 33, thus, predicts values of the four pixels making up the input block, e.g., as divided by the splitter 31, selectively according to a binary DPCM method and a binary PCM method. FIG. 4 illustrates a second compression unit 33, such as that illustrated in FIG. 3, according to an embodiment of the present invention. Referring to FIG. 4, the second compression unit 33 may include a representative value determining unit 41, a pattern determining unit 42, and a binary DPCM/PCM compression unit 43, for example.

The representative value determining unit 41 identifies two representative values A and B, potentially different from any of the four pixel values, for representing the four pixel values making up the input block, for each color component of an input image. For example, the representative value determining unit 41 may identify two representative values A and B for representing Red (R) component values of four pixels making up an input block. Similarly, the representative value determining unit 41 may identify two representative values A and B, in the same way, for each of the Green (G) and Blue (B) component values for the input image. For example, in an embodiment, the representative value determining unit 41 may arrange R component values of four pixels making up a 2×2 block, e.g., as divided by the splitter 31, in a size order, and identify R component values having substantial or large differences with respect to neighboring values, as boundary values, from the R component values arranged in the size order. The representative value determining unit 41 may then identify the two representative values A and B based on these boundary values.

Figures 5, 6, 7:
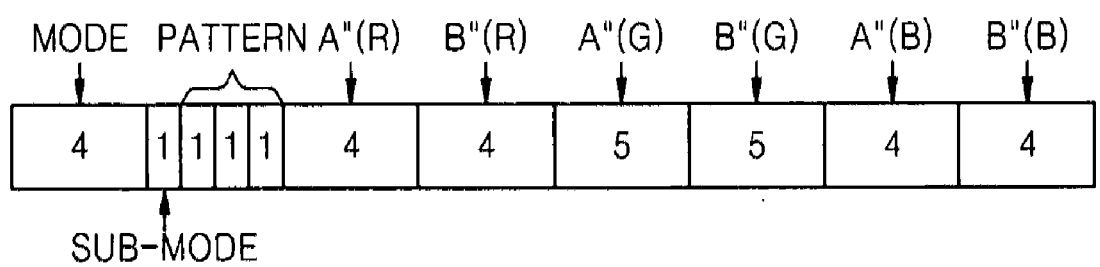
FIGS. 5 and 6 illustrate examples of binary areas to which an embodiment of the present invention is applied.
FIG. 7 illustrates an example of a bit steam packet, such as generated by a bit packing unit illustrated in FIG. 3, according to an embodiment of the present invention.

FIGS. 5 and 6 illustrate examples of binary areas to which a embodiment of the present invention may be applied.

Referring to FIG. 5, the 2×2 block 51 includes a pixel value "0" and three pixel values "100". In this example, the representative value determining unit 41 may arrange the pixel values in the order of "0", "100", "100", and "100", and identify boundary pixels values "0" and "100" as representing the greatest difference with respect to neighboring values. As an example, the representative value determining unit 41 may further set the left pixel value "0" as the aforementioned representative value A and the right pixel value "100" as the aforementioned representative value B, based the boundary pixel values "0" and "100".

Here, the 2×2 block 51 is shown as only including two type of values. However, all binary areas may not be limited to only two type of values, and some binary areas have two groups of similar pixel value types, with each group having slightly different values. As an example, the 2×2 block 52 of FIG. 5 includes four pixel values "100", "102", "0", and "2". In this case, the representative value determining unit 41 may identify boundary pixel values among the four pixel values "100", "102", "0", and "2", and classify the four pixel values "100", "102", "0", and "2" into two groups, based on the boundary pixel values. That is, the representative value determining unit 41 may set an average value of pixel values belonging to a first group among the two groups as the value A, and set an average value of pixel values belonging to a second group among the two groups as the value B.

That is, the representative value determining unit 41 may arrange the four pixel values in the order of "0", "2", "100", "102", and identify boundary pixel values "2" and "100" having the greatest differences, for example, with respect to neighboring pixel values. Then, the representative value determining unit 41 may classify the four pixel values into groups of "0" and "2" and "100" and "102", based on the identified boundary pixel values "2" and "100", and set the average value "1" of "0" and "2" as the representative value A and set an average value "101" of "100" and "102" as the representative value B. In this way the representative values A and B may be set. However, briefly, the arrangement (100, 102, 0, 2) of the original pixel values may be different from the arrangement of the two representative values A and B. Accordingly, in order to match the arrangement of the representative values to that of the original pixel values, the representative value determining unit 41 may set the value "101", obtained from the pixel value "100" which appears first in the 2×2 block 52, to the representative value A, and set the value "1" to the representative value B.

The pattern determining unit 42 may further identify a pattern of the four pixel values represented by the two representative values A and B, e.g., determined by the representative value determining unit 41, for each color component of the input image. For example, the pattern determining unit 42 may identify the pattern for the R component values of four pixels that are represented by the two representative values A and B. Similarly, the pattern determining unit 42 may identify the pattern for the respective four pixel values, in the same way, for G and B component values of the input image.

In more detail, the pattern determining unit 42 may represent the four pixel values making up the input block through the two representative values A and B, e.g., as determined by the representative value determining unit 41, for each color component for the input image, and arrange the four pixel values represented by the two representative values A and B in an a raster scan order. Further, the pattern determining unit 42 may set a first value, among the arranged values and the same value (or the same values) as the first value, to a pattern value "1", and set the remaining values which are different from the first value to a pattern value "0", for each color component of the input image, thereby identifying and signaling the pattern of four pixel values represented by the two values A and B.

Accordingly, in the case of the 2×2 block 51 of FIG. 5, the pattern determining unit 42 may arrange the four pixel values, as represented by the representative values A and B, in the order of "0", "100", "100", and "100", set a first value "0" among the arranged values and the same value (in this case, the same value does not exist) as the first value "0", to "1", and set the remaining values "100", which of course are different from the first value "0", to "0", thereby identifying a pattern of (1, 0, 0, 0) for the four pixel values. In the case of the 2×2 block 52 of FIG. 5, the pattern determining unit 42 may arrange the four pixels, as represented by the representative values A and B, in the order of "11", "11", "101", and "101", set a first value "1" among the arranged values and the same value as the first value "1", to "1", and set the remaining values "101", which are of course different from the value "1", to "0", thereby identifying a pattern (1, 1, 0, 0) of the four representative pixel values.

As described above, a 2×2 block corresponding to a binary area can be represented by two representative values A and B and a pattern for four such representative pixel values, for each color component of an input image. Generally, the patterns of color components of the input image are equal to each other, due to image similarity for color components. If the patterns of the color components of the input image are not equal to each other, all the patterns of the color components of the input image may be transmitted to the image restoring system 23, shown in FIG. 2, or a representative pattern among the patterns of the color components of the input image may be transmitted to the image restoring system 23. In the case where the representative pattern among the patterns of the color components of the input image is transmitted to the image restoring system 23, the pattern determining unit 42 may identify, as a representative pattern, a pattern of a color component in which a difference between two representative values A and B is a maximum, from among the patterns of the color components of the input image, for example.

The binary DPCM/PCM compression unit 43 may, thus, selectivley compresses the four representative pixels values, i.e., using the two representative values A and B, and the pattern of the four representative pixel values, according to the binary DPCM method and the binary PCM method.

In more detail, the binary DPCM/PCM compression unit 43 may subtract two values A' and B', representing four pixel values making up a reference block corresponding to the input block, from the two representative values A and B, e.g., as identified by the representative value determining unit 41, for each color component for the input image, according to the binary DPCM method. Then, if the results Delta_A and Delta_B, i.e., of the respective subtraction operations, can be represented by a constant length of bits, the binary DPCM/PCM compression unit 43 may output the Delta_A and Delta_B results and the pattern determined by the pattern determining unit 42, as the resultant compressed data of the input block, to the mode selection unit 34, thereby compressing the four pixel values.

For example, the binary DPCM/PCM compression unit 43 may subtract two values A' and B', representing R component values of four pixels making up a reference block corresponding to the input block, from the two values A and B representing the R component values of the four pixels making up the input block, and output compressed values of the four pixel values corresponding to the Delta_A and Delta_B subtraction results and the pattern, e.g., as determined by the pattern determining unit 42, as the compressed data of the input block, to the mode selection unit 34, if the values Delta_A and Delta_B corresponding to the R components can be represented by a constant length of bits, thereby compressing the R component values of the four pixels, according to the binary DPCM mode. Similarly, the binary DPCM/PCM compression unit 43 may compress the G and B component values of the four pixels in a same manner.

A 2×2 block 61 of FIG. 6 includes two pixel values corresponding to "0" and two pixel values corresponding to "100". In the case of the 2×2 block 61, the representative value determining unit 41 may set the pixel value "0" as the value A and the pixel value "100" as the value B, as described above. In addition, the pattern determining unit 42 may identify the pattern (1, 0, 0, 1) for four representative pixel values, as described above. A 2×2 block 62 of FIG. 6 similarly includes two pixel values "5" and two pixel values "100". In the case of the 2×2 block 62, the representative value determining unit 41 may thus set the corresponding value A to be the pixel value "5" and the corresponding value B to be pixel value "100", as described above. Further, the pattern determining unit 42 may, thus, identify a pattern (1, 0, 0, 1) for the four representative pixel values, as described above.

Referring to FIG. 6, if the 2×2 block 61 is a previous stored block, i.e., used as the above-mentioned reference block, and the 2×2 block 62 is the input block, the binary DPCM/PCM compression unit 43 may subtract A=0 and B=100 from A=5 and B=100, respectively, and thus obtains Delta_A=5 and Delta_B=0. The values Delta_A=5 and Delta_B=0 can then be represented by 4 bits because they correspond to binary numbers "0000" and "01101", respectively. Accordingly, no data loss would occur during data compression.

In an embodiment, the constant length of bits is 4 bits for R and B components, and 5 bits for G components. Accordingly, if the respective Delta_A and Delta_B for the R and B components can be represented by 4 bits and the Delta_A and Delta_B for the G component can be represented by 5 bits, the binary DPCM/PCM compression unit 43 may output the respective Delta_A and Delta_B for each of the respective color components and the pattern determined by the pattern determined unit 42 to the mode selection unit 34.

However, here, if the subtracted results Delta_A and Delta_B cannot be represented by the constant length of bits, the binary DPCM/PCM compression unit 43 may truncate parts of bits of the two values A and B representing the four pixel values making the input block, and output the compressed values of the four representative pixel values corresponding to the results of the truncation, and the pattern determined by the pattern determining unit 42, as compressed data of the input block, to the mode selection unit 34, thereby compressing the four representative pixel values, respectively for each color component of the input image. In this example, since the constant length of bits is 4 bits for R and B components, and 5 bits for G components, the binary DPCM/PCM compression unit 43 may merely truncate the lower 4 bits from 8 bits of each of R and B component values of the four representative pixels making up the input block, and truncate the lower 3 bits from bits of G component values of the four pixels. In the case of the 2×2 block 62 illustrated in FIG. 6, the binary DPCM/PCM compression unit 43 truncates the lower 4 bits of A=5 and B=100, that is, A=00000101 and B=01100100. As a result, though data loss would occur during the compression, the truncation would result in A=0000 and B=0110.

The mode selection unit 34 may then select a mode indicating the compression method that was used with the input block, from among a plurality of modes corresponding to the DPCM method, the PCM method, the transformation method, the binary DPCM method, and the binary PCM method, e.g., based on the compression results of the first compression unit 32 and the second compression unit 33. In more detail, in an embodiment, the mode selection unit 34 may calculate differences between the four pixel values making up a restoration of a compression of the input block, e.g., as restored according to the DPCM method, the PCM method, and the transformation method, which may be used by the restoration unit 35, and the binary DPCM method or the binary PCM method, which may be used by the binary DPCM/PCM compression unit 43, and the input four pixel values making up the input block as divided by the splitter 31, and select a mode representing an image compression method in which a sum of the differences is a minimum, from among the plurality of modes corresponding to the DPCM method, the PCM method, the transformation method, the binary DPCM method, and the binary PCM method, for example. Specifically, in an embodiment, since differences corresponding to R, G, and B components exist separately, the mode selection unit 34 may select a mode in which a sum of differences corresponding to the R, G, and B components is a minimum, from among the plurality of modes.

The restoring unit 35 may, thus, restore the four pixel values making up the input block, as compressed, using the data compressed by the binary DPCM/PCM compression unit 43, according to the DPCM method, the PCM method, and the transformation method. Similarly, the restoring unit 35 may restore the four pixel values making up the input block, as compressed, using the compressed values A" and B" of the 4 pixel values corresponding to the data compressed by the DPCM/PCM compression unit 43, and the pattern of the four pixel values, according to the binary DPCM method or the binary PCM method used by the DPCM/PCM compression unit 43. Here, further details of the restoring unit 35 will be provided in the following description related to the operations of a first restoring unit 83 and a second restoring unit 85 illustrated in FIG. 8.

The bit packing unit 36 may, thus, generate mode data indicating the mode selected by the mode selection unit 34, and a bit stream packet including compressed data corresponding to the mode, and output the mode data and the bit stream packet to the memory 22, for example. Particularly, if the mode selected by the mode selection unit 34 corresponds to one of the binary DPCM method and the binary PCM method, the compressed data may include sub mode data indicating a sub mode determined by the second compression unit 33, pattern data representing the pattern of the four pixel values determined by the second compression unit 33, and the compressed values A" and B" of the four pixel values received from the second compression unit 33.

FIG. 7 illustrates an example of a bit steam packet that may be generated by the bit packing unit 36 illustrated in FIG. 3, according to an embodiment of the present invention.

Referring to FIG. 7, the bit stream packet may include, for example, 4 bits of mode data, 1 bit of sub mode data, 3 bits of pattern data, 8 bits of two representative values A" and B" corresponding to R components, wherein 4 bits are assigned to each representative value, 10 bits of two representative values A" and B" corresponding to G components, wherein 5 bits are assigned to each representative value, and 8 bits of two representative values "A" and "B" corresponding to B components, wherein 4 bits are assigned to each representative value.

As described above, since the pattern determining unit 42 sets a first value among arranged pixel values and the same value (or the same values) as the first value, to "1", the first bit of the pattern data is always "1". Accordingly, the bit packing unit 36 can omit encoding the first bit of the pattern data, i.e., as it is known or presumed, and generate a bit stream packet including a total of 3 bits of the pattern data from the second bit to the fourth bit.

As illustrated in FIG. 7, in this example, the bit packing unit 36 may assign 4 bits to each of two representative values A" and B" corresponding to R and B components, and 5 bits to each of two representative values A" and B" corresponding to G components, thereby generating a total of 34 bits of a bit stream packet. In order to accurately ⅓ compress 96 bits of an original 2×2 block, that is, in order to generate a total of 32 bits of a bit stream packet, 4 bits can be assigned to each of two representative values A" and B" corresponding to each of R, G, and B components, for example.

Figure 8:
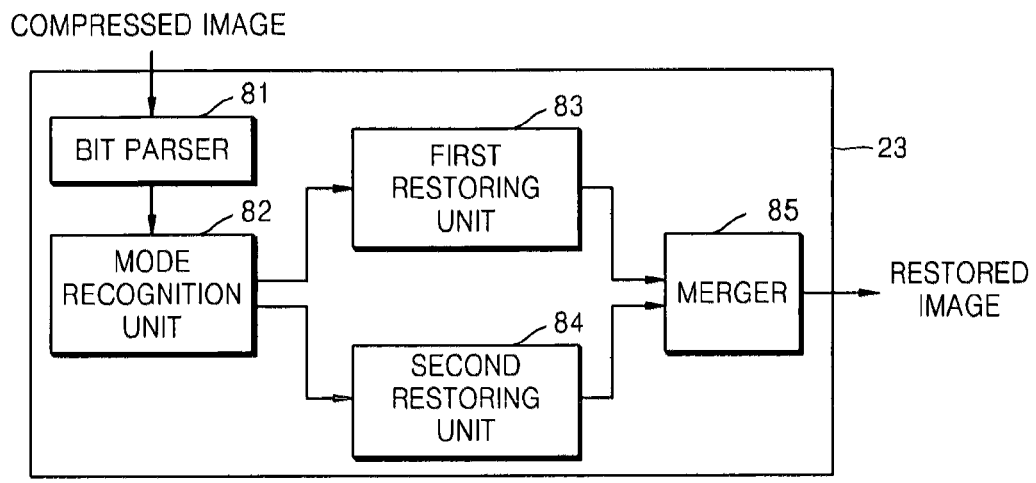
FIG. 8 illustrates an image restoring system, such as that illustrated in FIG. 2, according to an embodiment of the present invention.

FIG. 8 illustrates an image restoring system 23, such as illustrated in FIG. 2, according to an embodiment of the present invention.

Referring to FIG. 8, the image restoring system 23 may include a bit parser 81, a mode recognition unit 82, a first restoring unit 83, a second restoring unit 84, and a merger 85, for example. In order to further enhance an image compression rate, the image restoring system 23 may include less or further different components such as a decoder for performing entropy-decoding, other than the components illustrated in FIG. 8, noting that alternatives are equally available.

The bit parser 81 may read a bit stream packet from the memory 22 of FIG. 2, for example, parse the bit stream packet to extract compressed data of an compressed block and mode data indicating an image compression method used by the image compression system 21, among the DPCM method, the PCM method, and the transformation method, from the bit stream packet, and output the compressed data of the compressed block and the mode data to the mode recognition unit 82. Specifically, if the mode data indicates the binary DPCM method or the binary PCM method, the compressed data of the compressed block includes sub mode data representing a method used by the image compression system 21 among the binary DPCM method and the binary PCM method, two compressed values A" and B" of four pixel values making up the compressed block, and pattern data representing the pattern of the four representative pixel values making up the compressed block.

The mode recognition unit 82 thus may recognize a sub mode and a mode corresponding to an image compression method that was used, e.g., by the image compression system 21, from among a variety of image compression methods, from the mode data extracted by the bit parser 81. The mode recognition unit 82 may then output the compressed data extracted by the bit parser 81 to the first restoring unit 83 if the recognized mode is one of the DPCM method, the PCM method, and the transformation method, and output the compressed data extracted by the bit parser 81 to the second restoring unit 84 if the recognized mode is one of the binary DPCM method and the binary PCM method, for example.

The first restoring unit 83 may thereafter restore four pixel values making up a corresponding restored block, using the compressed data extracted by the bit parser 81, according to one of the DPCM method, the PCM method, and the transformation method, e.g., as indicated by the mode recognized by the mode recognition unit 82. In more detail, if the mode recognized by the mode recognition unit 82 is a mode based on the DPCM method, the first restoring unit 83 may shift the compressed data extracted by the bit parser, by the number of bits corresponding to the recognized mode, in a direction of the left, according to the DPCM method, add a predetermined binary value corresponding to the recognized mode to the result of the shifting, restore differences between the four pixel values making up the compressed block and four pixel values making up a reference block, and add the restored differences to the four pixel values making up the reference block, thereby restoring four pixel values making up the restored block. In addition, if the recognized mode indicates the PCM method, the first restoring unit 83 may add a predetermined binary value to the compressed data extracted by the bit parser 81, thereby restoring four pixel values making up the restored block, according to the PCM method. Still further, if the recognized mode indicates the transformation method was the compression method, the first restoring unit 83 may perform Inverse Discrete Cosine Transformation (IDCT), etc., on the compressed data extracted by the bit parser 81, according to the transformation method, thereby restoring four pixel values making up the restored block.

Figure 9:
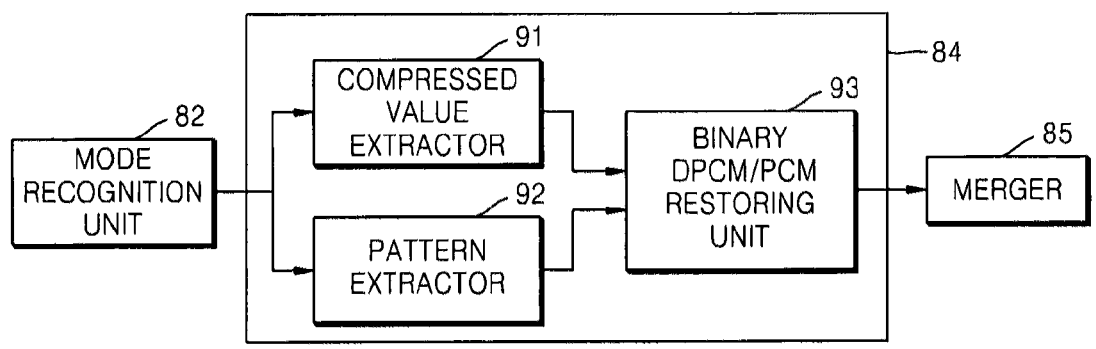
FIG. 9 illustrates a second restoring unit, such as illustrated in FIG. 8, according to an embodiment of the present invention.

The second restoring unit 84 may restore four pixel values making up the restored block, using the pattern of the four pixel values and the two compressed values A" and B" of the four pixel values corresponding to the compressed data extracted by the bit parser 81, according to the sub mode recognized by the mode recognition unit 82, for example. FIG. 9 illustrates a second restoring unit 84, such as that of illustrated in FIG. 8, according to an embodiment of the present invention. Referring to FIG. 9, the second restoring unit 84 may further include a compressed value extractor 91, a pattern extractor 92, and a binary DPCM/PCM restoring unit 93, for example.

The compressed value extractor 91 may extract two compressed values A" and B" of the four pixel values making up the compressed block from the compressed data extracted by the bit parser 81, for each color component of a corresponding image. For example, the compressed value extractor 91 may extract two compressed values A" and B" corresponding to R components of the four pixel values making up the compressed block, from the compressed data extracted by the bit parser 81. Also, the compressed value extractor 91 may extract two compressed values A" and B", in a same or similar way, for the G and B components of the corresponding image.

The pattern extractor 92 may extract a pattern of four pixel values making up the compressed block, from the compressed data extracted by the bit parser, for each color component of the corresponding image. For example, the pattern extractor 92 may extract a pattern of R component values of four pixel values making up the compressed block, from the compressed data extracted by the bit parser 81. Similarly, the pattern extractor 92 may extract a pattern of four pixel values making up the compressed block, in a same or similar way, for the G and B components of the corresponding image.

The binary DPCM/PCM restoring unit 93 may restore four pixel values making up the restored block, using the two compressed values A" and B" extracted by the compressed value extractor 91 and the pattern of the four pixel values extracted by the pattern extractor 92, according to the sub mode recognized by the mode recognition unit 82, for example.

In more detail, if the sub mode indicates the binary DPCM method, the binary DPCM/PCM restoring unit 93 may add the two compressed values A" and B" (that is, Delta_A and Delta_B) extracted by the compressed value extractor 91, to two values A' and B' representing four pixel values making up a reference block corresponding to the compressed block, thereby restoring two values A and B representing four pixel values making up the restored block, for each color component of the corresponding image, according to the binary DPCM method. For example, the binary DPCM/PCM restoring unit 93 may add the two compressed values A" and B" (that is, Delta_A and Delta_B) corresponding to the R components extracted by the compressed value extractor 91, to two values A' and B' representing R component values of four pixels making up a reference block corresponding to the compressed block, thereby restoring two values A and B representing R component values of four pixels making up the restored block. Similarly, the binary DPCM/PCM restoring unit 93 may restore two representative values A and B, in a same or similar way, for the G and B components of the corresponding image.

In addition, if the sub mode indicates the binary PCM method was used for the compression, the binary DPCM/PCM restoring unit 93 may add a predetermined binary value to each of the two compressed values A" and B", e.g., as extracted by the compressed value extractor 91, thereby restoring two values A and B representing four pixel values making up the restored block, for each color component of the corresponding image, according to the binary PCM method. For example, the binary DPCM/PCM restoring unit 93 may add 4 bits of a binary value to 4 bits of the two compressed values A" and B" corresponding to the R components extracted by the compressed value extractor 91, thereby restoring two values A and B representing R component values of the four pixels making up the restored block. Similarly, the binary DPCM/PCM restoring unit 93 may restore two representative values A and B, in a same or similar way, for the G and B component values of the corresponding image.

Figure 10:
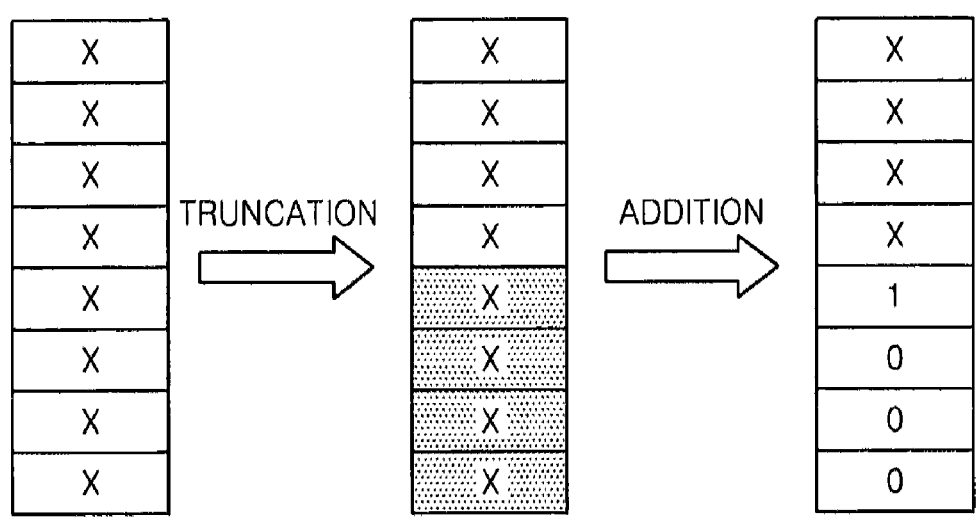
FIG. 10 illustrates a process of performing truncation and addition of 8 bits of a pixel value according to a binary Pulse Code Modulation (PCM) method, according to an embodiment of the present invention.

FIG. 10 illustrates a process of performing truncation and addition of 8 bits of a pixel value according to the binary PCM method, according to an embodiment of the present invention.

Referring to FIGS. 2 and 10, the example image compression system 21 may truncates 4 bits from 8 bits of R component values. Successively, the image restoring system 23 may, thus, adds "1000" to the 4 bits of the compressed data, thereby restoring 8 bits of R component values. In an embodiment, the reason 4 bits of "1000" are added is because the 4-bit value "1000" is the intermediate value among all possible values which can be represented by 4 bits. Likewise, 3 bits of "100" may be added to G component values, and 4 bits of "1000" may be added to B component values. However, it is noted that embodiments of the present invention are not limited to such an arrangement, and different values can be added to R, G, and B component values in order to improve image compression efficiency and picture quality of restored images.

In addition, the binary DPCM/PCM restoring unit 93 may, thus, insert the two representative values A and B restored according to the binary DPCM method or the binary PCM method as described above, into locations indicated by the pattern extracted by the pattern extractor 92, thereby restoring four pixel values making up the restored block for each color component of the corresponding image. For example, if the two representative values A and B, e.g., restored according to the binary DPCM method or the binary PCM method, are "0" and "100" and the pattern extracted by the pattern extractor 92 is (1, 0, 0, 1), the first value A=0 of the two representative values "0" and "100" can be inserted into the location of the corresponding value "1" of the pattern, and the second value B=100 of the two representative values "0" and "100" inserted into the location of the corresponding value "0" of the pattern, thereby restoring four pixel values "0", "100", "100", and "0" making up the restored block.

The merger 85 may further merge 2×2 blocks, each 2×2 block having a total of 96 bits and having four 8-bit pixels for each of R, G, and B components restored by the first restoring unit 83 or the second restoring unit 84, thereby reconstructing the corresponding image.

Figure 11:
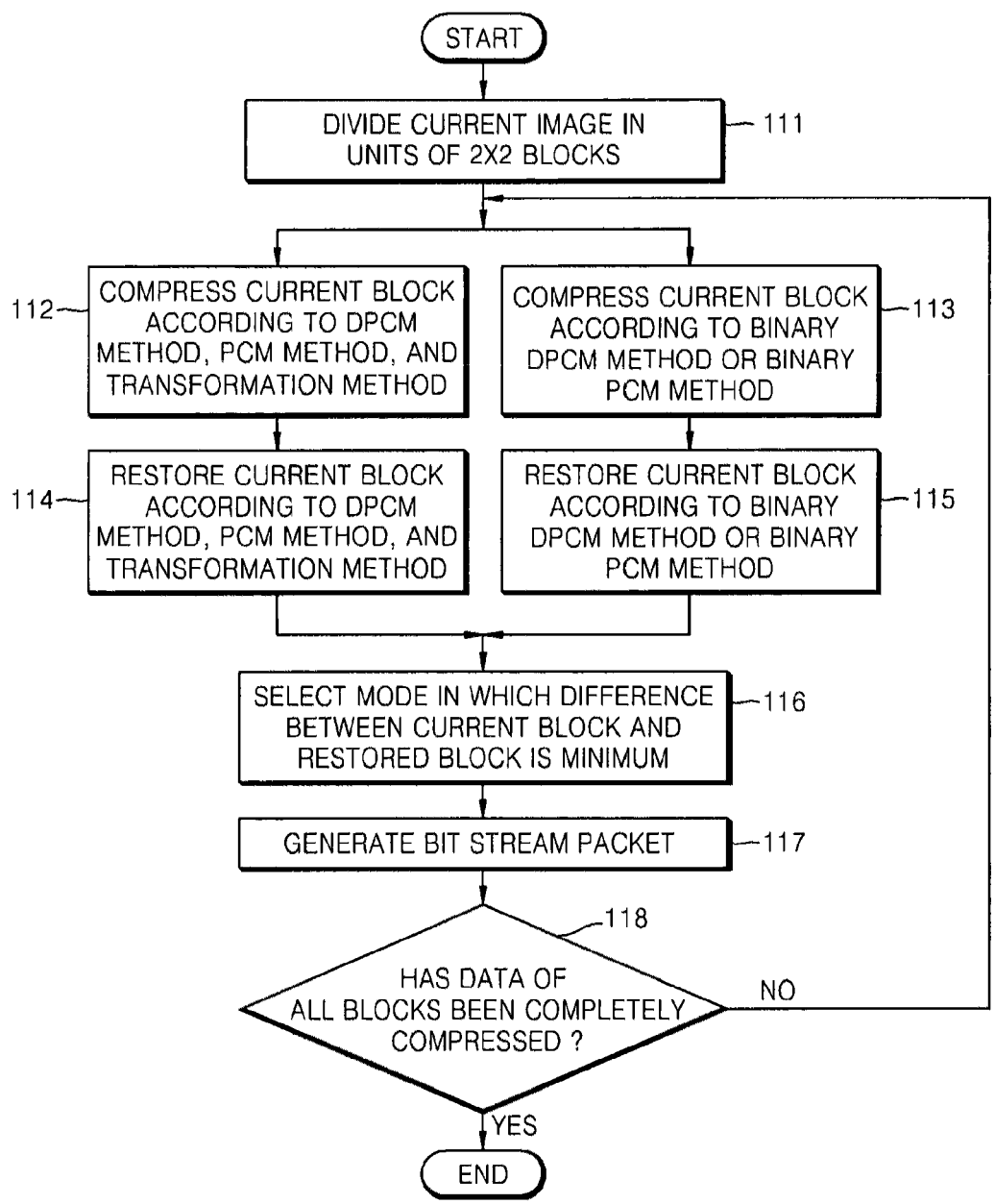
FIG. 11 illustrates an image compression method, according to an embodiment of the present invention.

FIG. 11 illustrates a pixel value prediction method, according to an embodiment of the present invention. As only one example, such an embodiment may correspond to example sequential processes of the example system 21 illustrated in FIG. 3, but is not limited thereto and alternate embodiments are equally available.

In operation 111, an input image may be received and divided in units of 2×2 blocks.

In operation 112, four pixel values making up an input block, e.g., divided in operation 111, may be compressed according to the DPCM method, the PCM method, and the transformation method.

In operation 113, the four pixel values making up the input block may be compressed using values A and B representing the four pixel values making up the input block, and a pattern of the four pixel values, according to the binary DPCM method or the binary PCM method.

In operation 114, four pixel values making up the compressed input block may be restored using the data compressed in operation 112, for example, according to the DPCM method, the PCM method, and the transformation method.

In operation 115, four pixel values making up the compressed input block may be restored using the compressed values A" and B" of the four pixel values corresponding to the data compressed in operation 113 and the pattern of the four pixel values, according to the binary DPCM method or the PCM method, as used in operation 113.

In operation 116, differences between the four pixel values making up the restored block, e.g., restored in operations 114 and 115, and four pixel values making up the input block, e.g., as divided in operation 111, may be calculated and a mode may be selected for representing an image compression method in which a sum of the differences is a minimum, from among a plurality of modes corresponding to the DPCM method, the PCM method, the transformation method, the binary DPCM method, and the binary PCM method.

In operation 117, a bit stream packet including mode data representing the mode, e.g., selected in operation 116, and compressed data corresponding to the mode may then be generated.

In operation 118, the image compression system 21 determines whether data of all blocks constructing the input image has been completely compressed, and returns to operation 112 if the data compression is not complete, and terminates the process if the data compression is complete.

Figure 12:
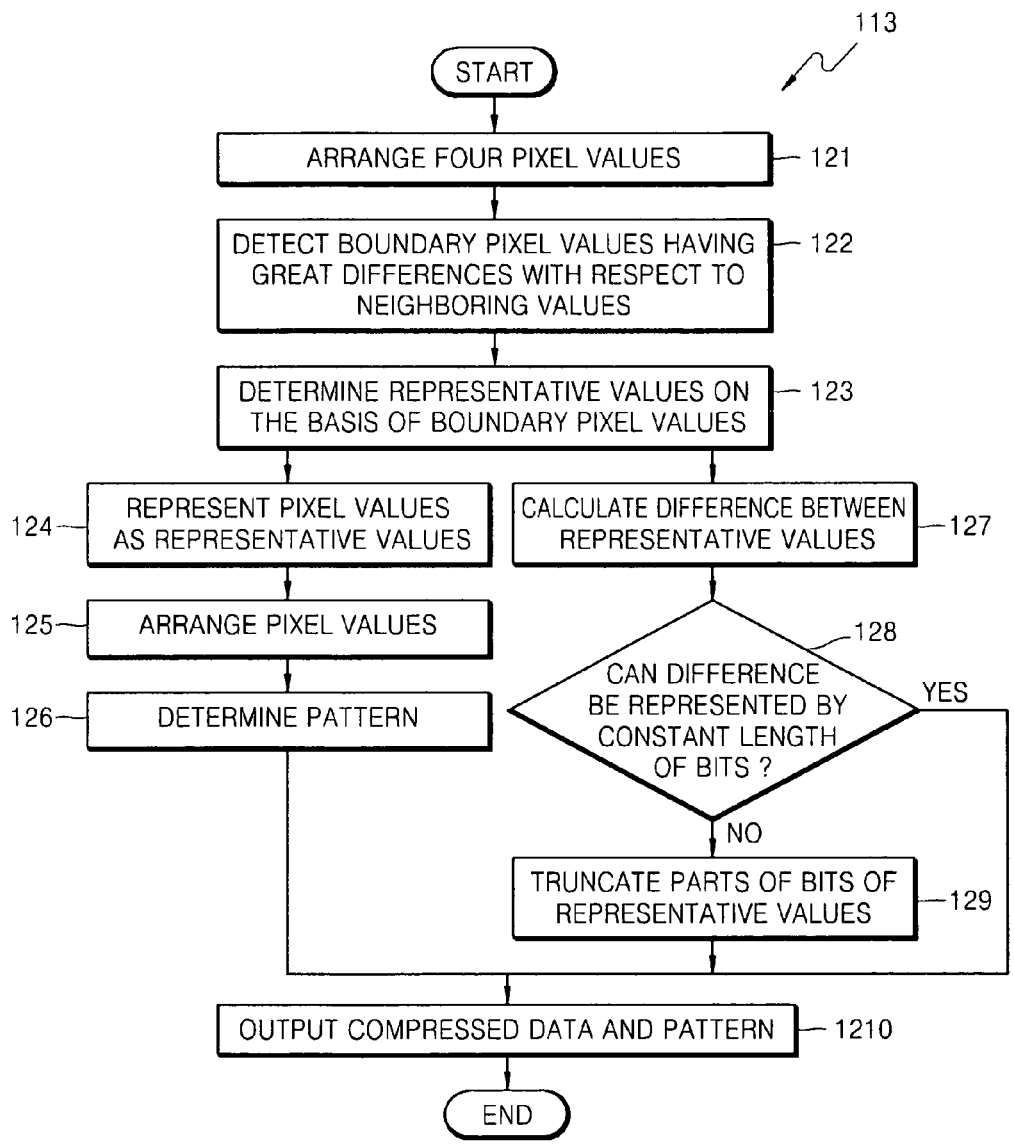
FIG. 12 illustrates an image compression method, such as corresponding to operation 113 of FIG. 11, according to an embodiment of the present invention.

FIG. 12 illustrates an image compression method, such as corresponding to operation 113 illustrated in FIG. 11, according to an embodiment of the present invention. As only one example, such an embodiment may correspond to example sequential processes of the example second compression unit 33 illustrated in FIG. 4, but is not limited thereto and alternate embodiments are equally available.

In operation 121, four pixel values making up a input block, e.g., as divided by the splitter 31 of FIG. 3, may be arranged in a size order, for each color component of an input image.

In operation 122, boundary pixel values having great or substantial differences with respect to neighboring values may be identified, from among the four pixel values arranged in the size order, for example.

In operation 123, two representative values A and B may then be identified based on the detected boundary values.

In operation 124, the four pixel values making up the input block may then be represented by the two representative values A and B, e.g., determined in operation 123, for each color component of the input image.

In operation 125, four representative pixel values, represented by the two representative values A and B in operation 124, may then be arranged in an order of raster scan.

In operation 126, the first value of the values arranged in operation 125 and the same value (or the same values) as the first value may be set to "1", and the remaining values which are different from the first value may be set to "0", thereby identifying a pattern for the four representative pixel values.

In operation 127, two values A and B, representing four pixel values making up a reference block corresponding to the input block may then be subtracted from the two representative values A and B, e.g., determined in operation 123, for each color component of the input image, according to the binary DPCM mode.

In operation 128, the process may proceed to operation 129 if the results Delta_A and Delta_B of the subtraction cannot be represented by a constant length of bits, and the process may proceed to operation 1210 if the results Delta_A and Delta_B of the subtraction can be represented by a constant length of bits, for example.

In operation 129, portions of the bits of the two values A and B representing the four pixel values constructing the input block may be truncated, for each color component of the input image, according to the binary PCM mode.

In operation 1210, the subtracted results Delta_A and Delta_B, obtained in operation 127, or the truncated results, obtained in operation 129, may be output with the pattern determined in operation 126, thereby compressing four pixel values making up the input block.

Figure 13:
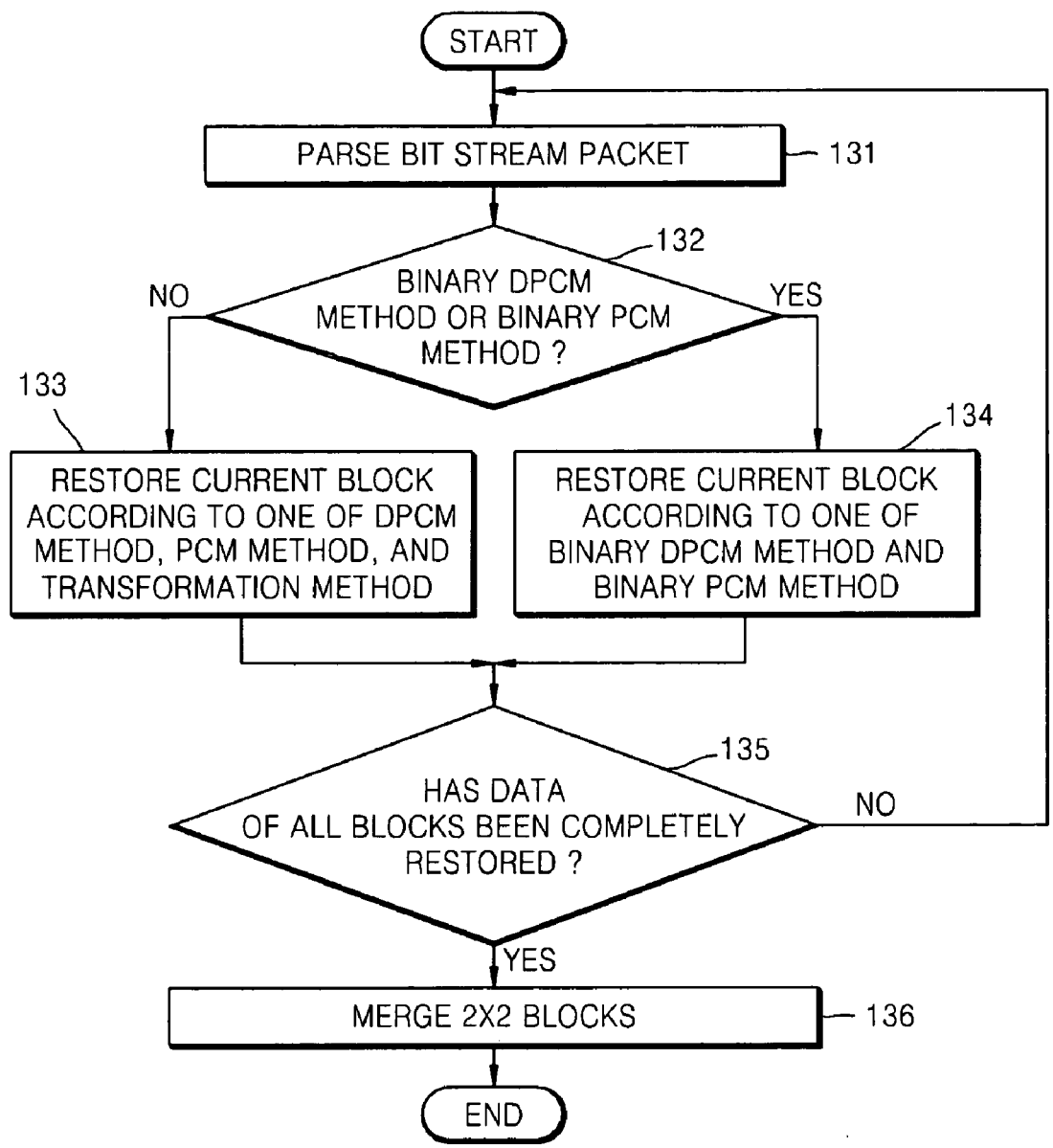
FIG. 13 illustrates an image restoring method, according to an embodiment of the present invention.

FIG. 13 illustrates an image restoring method, according to an embodiment of the present invention. As only one example, such an embodiment may correspond to example sequential processes of the example image restoring system 23 illustrated in FIG. 3, but is not limited thereto and alternate embodiments are equally available.

In operation 131, a bit stream packet may be read, e.g., from the memory 22, and the bit stream packet parsed to extract compressed data of a compressed block and mode data indicating the corresponding image compression method, such as used by such an image compression system 21 that generated the compressed block, from among a variety of image compression methods.

In operation 132, a sub mode and a mode indicating the corresponding image compression method, from among a variety of image compression methods, may be read from the extracted mode data. If the recognized mode indicates one of the DPCM method, the PCM method, and the transformation method, the process proceeds to operation 133, and if the recognized mode indicates one of the binary DPCM method and the binary PCM method, the process proceeds to operation 134.

In operation 133, four pixel values making up the restored block may be restored using the extracted compressed data according to one of the DPCM method, the PCM method, and the transformation method, corresponding to the mode recognized in operation 132, for example.

In operation 134, four pixel values making up the restored block may be restored using two compressed values A" and B" of the four pixel values corresponding to the extracted compressed data and a pattern of the four pixel values according to one of the binary DPCM method and the binary PCM method, corresponding to the sub mode recognized in operation 132, for example.

In operation 135, it may be determined whether data of all blocks making up the corresponding image has been completely restored, and the process may return to operation 131 if data of all blocks making up the corresponding image has been not completely restored, and the process may proceed to operation 136 if data of all blocks making up the corresponding image have been completely restored.

In operation 136, 2×2 blocks may then be merged, with each 2×2 block having a total of 96 bits, with four 8-bit pixels for each of R, G, and B components restored in operation 133 or 134, thereby reconstructing the corresponding image.

Figure 14:
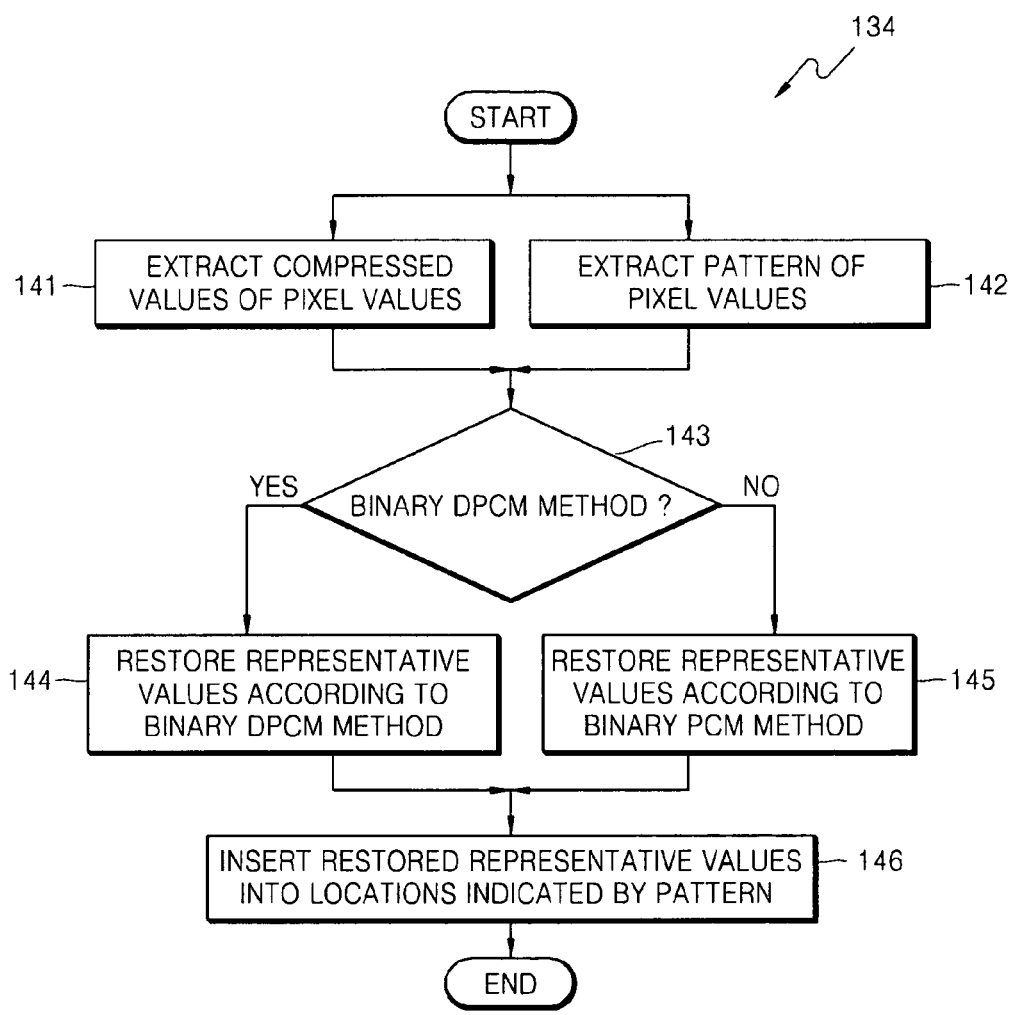
FIG. 14 illustrates an image restoring method, such as corresponding to operation 134 of FIG. 13, according to an embodiment of the present invention.

FIG. 14 illustrates an image restoring method, such as corresponding to operation 134 illustrated in FIG. 13, according to an embodiment of the present invention. As only one example, such an embodiment may correspond to example sequential processes of the example second restoring unit 84 illustrated in FIG. 9, but is not limited thereto and alternate embodiments are equally available.

In operation 141, two compressed values A" and B" of four pixel values making up a compressed block may be extracted from compressed data by a bit parser 81, for example, for each color component of a corresponding image.

In operation 142, a pattern of four pixel values making up the compressed block may be extracted from the compressed data the bit parser 81, for each color component of the input image.

In operation 143, it may be determined that a sub mode recognized by the mode recognition unit 82, for example, corresponds to one of the binary DPCM method and the binary PCM method, and the process may appropriately proceed to operation 144 if the sub mode corresponds to the binary DPCM method to the operation 145 if the sub mode corresponds to the binary PCM method.

In operation 144, the two compressed values A" and B" (that is, Delta_A and Delta_B), e.g., extracted in operation 141 may be added, respectively, to two values A' and B' representing four pixel values making up a reference block corresponding to the compressed block, thereby restoring two values A and B representing four pixel values making up the restored block, for each color component of the corresponding image, according to the binary DPCM method.

In operation 145, a predetermined binary value may be added to the two compressed values A" and B", e.g., extracted in operation 141, thereby restoring two values A and B representing four pixel values making up the restored block, for each color component of the corresponding image, according to the binary PCM method.

In operation 146, the two representative values A and B, e.g., restored according to the binary DPCM method or the binary PCM method, as described above, may then be inserted into the corresponding locations indicated by the pattern extracted in operation 142, thereby restoring four pixel values making up the restored block, for each component of the corresponding image.

According to one or more embodiments of the present invention, by compressing pixel values making up a 2×2 block, using representative values representing the pixel values and a pattern of the pixel values represented by the representative values, it is possible to effectively compress binary images in which similarities between pixel values do not substantially exist, and accordingly, improve the compression rate of corresponding binary images. In addition, according to one or more embodiments of the present invention, by extracting compressed values and a pattern of pixel values making up a 2×2 block in a corresponding image, from compressed data of the 2×2 block, and restoring pixel values using the compressed values and the pattern, it is possible to effectively restore binary images, and accordingly improve the picture-quality of the binary images.

Furthermore, according to one or more embodiments of the present invention, by compressing pixel values making up a 2×2 block in an input image, according to a variety of image compression methods, selecting a mode indicating one among the image compression methods, and generating a bit stream packet including compressed data corresponding to the mode, it is possible to effectively compress a variety of images as well as binary images. Further, according to one or more embodiments of the present invention, by extracting mode data and compressed data of a 2×2 block in a corresponding image, from the bit stream packet, recognizing a mode indicating one of a plurality of image compression methods from the mode data, and restoring pixel values using the compressed data according to an image compression method corresponding to the recognized mode, it is it is possible to effectively compress a variety of images as well as binary images.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image compression method, comprising:
   identifying representative values of pixel values making up a block having a predetermined size in an image;
   identifying a pattern of the pixel values, as represented by the representative values; and
   compressing the pixel values using the representative values and the pattern,
   wherein the pattern comprises bits of the same number as the number of the pixel values, and at least one part of the bits is transmitted to an image restoring apparatus.

2. The method of claim 1, wherein the outputting of the information of the representative values and the pattern as the compressed data is selectively performed over alternative compression techniques for compressing the pixel values.

3. The image compression method of claim 1, wherein the compressing of the pixel values using the representative values and the pattern further comprises truncating portions of bits representing the representative values, and selectively outputting a result of the truncation and the pattern, as the compressed pixel values.

4. The image compression method of claim 1, further comprising:
compressing the pixel values making up the block having the predetermined size in the image according to a plurality of predetermined image compression techniques;
selecting a mode from among a plurality of modes corresponding to the plurality of predetermined image compression techniques and a resultant image compression technique used in the compressing of the pixel values using the representative values based on a comparison of compressed results of the plurality of predetermined image compression techniques and the resultant image compression technique used in the compressing of the pixel values using the representative values; and
generating a bit stream packet including mode data representing the selected mode, and compressed data, corresponding to the selected mode representing an indication of one of the compressed results of the plurality of predetermined image compression techniques and the resultant image compression technique used in the compressing of the pixel values using the representative values.

5. The image compression method of claim 4, further comprising generating respective restored pixel values from the compressed results of the plurality of predetermined image compression techniques and the resultant image compression technique used in the compressing of the pixel values using the representative values, such that the comparison includes calculating differences between the respective restored pixel values and the pixel values making up the block, and selecting the selected mode based upon a result of the comparison corresponding to a corresponding image compression technique with a minimum difference between the respective restored pixel values and the pixel values making up the block.

6. The image compression method of claim 4, further comprising generating restored pixel values from the mode data and the compressed data and comparing the restored pixel values to subsequent pixel values making up a block of the image.

7. The image compression method of claim 6, further comprising controlling a voltage signal in an TFT-LCD panel based upon a result of the comparing of the restored pixel values to the subsequent pixel values for predicting a voltage value for achieving a target response time of the TFT-LCD panel for the subsequent pixel values.

8. An image compression method, comprising:
identifying representative values of pixel values making up a block having a predetermined size in an image by identifying representative values for pixel values of each color component of the image;
identifying a pattern of the pixel values, as represented by the representative values;
determining, as a pattern for all color components of the image, a representative pattern in which a difference between respective representative values is greatest, among respective patterns for all the color components of the image; and
compressing the pixel values using the representative values and the representative pattern.

9. An image compression method, comprising:
identifying representative values of pixel values making up a block having a predetermined size in an image;
identifying a pattern of the pixel values, as represented by the representative values; and
compressing the pixel values using the representative values and the pattern,
wherein the identifying of the representative values further comprises:
identifying boundary pixel values having substantial differences with respect to neighboring pixel values, relative to locations of the pixel values within the image, from among a corresponding sequencing of the pixel values;
identifying the representative values based on the boundary pixel values.

10. The image compression method of claim 9, wherein the identifying of the representative values based on the boundary pixel values further comprises classifying the pixel values into a first group and a second group, based on the boundary pixel values, setting a first average value of corresponding pixel values corresponding to the first group as a first representative value of the representative values, and setting a second average value of corresponding pixel values corresponding to the second group as a second representative value of the representative values.

11. An image compression method, comprising:
identifying representative values of pixel values making up a block having a predetermined size in an image;
arranging the representative values in a predetermined order;
identifying a pattern of the pixel values using the arranged representative values by setting a first representative value among the representative values to a first value, and setting a second representative value among the representative values to a second value; and
compressing the pixel values using the representative values and the pattern.

12. An image compression method, comprising:
identifying representative values of pixel values making up a block having a predetermined size in an image;
identifying a pattern of the pixel values, as represented by the representative values; and
compressing the pixel values using the representative values and the pattern,
wherein the compressing of the pixel values using the representative values and the pattern further comprises subtracting values representing pixel values making up a reference block, respectively, from the identified representative values, and selectively outputting a result of the subtraction and the pattern, as the compressed data of the pixel values,
wherein the reference block is a different compressed block of the image with a positional relationship with the block having the predetermined size.

13. An image compression method, comprising:
compressing pixel values making up a block having a predetermined size in an image according to a plurality of predetermined image compression techniques;
compressing the pixel values using representative values of the pixel values and a pattern of the pixel values, as represented by the representative values;
selecting a mode from among a plurality of modes corresponding to the plurality of predetermined image compression techniques and a resultant image compression technique used in the compressing of the pixel values using the representative values based on a comparison of compressed results of the plurality of predetermined image compression techniques and the resultant image compression technique used in the compressing of the pixel values using the representative values; and generating a bit stream packet including mode data representing the selected mode, and compressed data, corresponding to the selected mode representing an indication of one of the compressed results of the plurality of predetermined image compression techniques and the resultant image compression technique used in the compressing of the pixel values using the representative values, wherein the pattern comprises bits of the same number as the number of the pixel values, and at least one part of the bits is transmitted to an image restoring apparatus.

14. The image compression method of claim 13, further comprising generating respective restored pixel values from the compressed results of the plurality of predetermined image compression techniques and the resultant image compression technique used in the compressing of the pixel values using the representative values, such that the comparison includes calculating differences between the respective restored pixel values and the pixel values making up the block, and selecting the selected mode based upon a result of the comparison corresponding to a corresponding image compression technique with a minimum difference between the respective restored pixel values and the pixel values making up the block.

15. The image compression method of claim 13, further comprising generating restored pixel values from the mode data and the compressed data and comparing the restored pixel values to subsequent pixel values making up a block of the image.

16. An image compression method, comprising:
compressing pixel values making up a block having a predetermined size in an image according to a plurality of predetermined image compression techniques;
compressing the pixel values using representative values of the pixel values and a pattern of the pixel values, as represented by the representative values;
selecting a mode from among a plurality of modes corresponding to the plurality of predetermined image compression techniques and a resultant image compression technique used in the compressing of the pixel values using the representative values based on a comparison of compressed results of the plurality of predetermined image compression techniques and the resultant image compression technique used in the compressing of the pixel values using the representative values;
generating a bit stream packet including mode data representing the selected mode, and compressed data, corresponding to the selected mode representing an indication of one of the compressed results of the plurality of predetermined image compression techniques and the resultant image compression technique used in the compressing of the pixel values using the representative values;
generating restored pixel values from the mode data and the compressed data and comparing the restored pixel values to subsequent pixel values making up a block of the image; and
controlling a voltage signal in an TFT-LCD panel based upon a result of the comparing of the restored pixel values to the subsequent pixel values for predicting a voltage value for achieving a target response time of the TFT-LCD panel for the subsequent pixel values.

17. An image restoring method, comprising:
extracting compressed values of pixel values, making up a block having a predetermined size in an image, embedded in compressed data of the block;
extracting a pattern of the pixel values embedded in the compressed data; and
restoring the pixel values using the compressed values and the pattern,
wherein the pattern used for the restoring comprises bits of the same number as the number of the pixel values, and the pattern embedded in the compressed data comprises at least one part of the bits.

18. The image restoring method of claim 17, wherein the compressed values of the pixel values are of only two different values.

19. The image restoring method of claim 17, wherein the extracting of the compressed values comprises extracting respective compressed values of the pixel values for each color component of the image, and
the extracting of the pattern comprises extracting respective patterns of respective pixel values for each color component of the image.

20. The image restoring method of claim 17, further comprising:
extracting mode data and the compressed data of the block from a bit stream packet;
recognizing a mode indicating an image compression technique corresponding to the compressed data used to compress the compressed data, from among a plurality of image compression techniques, from the mode data; and
selectively restoring the pixel values making up the block corresponding to the compressed data using compressed values of the pixel values making up the block and the pattern, according to the recognized mode.

21. The image restoring method of claim 20, further comprising performing the restoring the pixel values making up the block, as a first image compression technique, using the compressed data if the recognized mode indicates that the mode is an image compressed mode utilizing representative values of the pixel values and pattern data of the pixel values, and
wherein the restoring of the pixel values further comprises selectively restoring the pixel values according to at least a second image compression technique different from the first compression technique if the recognized mode indicates that the mode is not the image compressed mode utilizing the representative values of the pixel values and the pattern data of the pixel values.

22. An image restoring method, comprising:
extracting compressed values of pixel values, making up a block having a predetermined size in an image, embedded in compressed data of the block;
extracting a pattern of the pixel values embedded in the compressed data; and
restoring the pixel values using the compressed values and the pattern,
wherein the restoring of the pixel values using the compressed values and the pattern comprises:
adding the compressed values to representative values representing pixel values making up a reference block corresponding to the block to restore representative values representing the pixel values, with at least one of the representative values respectively representing at least two of the pixel values; and
generating a restoration of the pixel values by sequencing the restored representative values according to sequencing defined by the pattern and outputting the restoration of the pixel values as the restored pixel values.

23. An image restoring method, comprising:
extracting compressed values of pixel values, making up a block having a predetermined size in an image, embedded in compressed data of the block;
extracting a pattern of the pixel values embedded in the compressed data; and
restoring the pixel values using the compressed values and the pattern,
wherein the restoring of the pixel values comprises:
adding a predetermined binary value, respectively, to the compressed values, thereby restoring representative values representing the pixel values making up the block, with at least one of the representative values respectively representing at least two of the pixel values; and
generating a restoration of the pixel values by sequencing the restored representative values according to sequencing defined by the pattern and outputting the restoration of the pixel values as the restored pixel values.

24. An image restoring method, comprising:
extracting mode data and compressed data of a block having a predetermined size in an image from a bit stream packet;
recognizing a mode indicating an image compression technique corresponding to the compressed data used to compress the compressed data, from among a plurality of image compression techniques, from the mode data; and
selectively restoring pixel values making up the block corresponding to the compressed data using compressed values of the pixel values making up the block and a pattern of the pixel values extracted from the compressed data, according to the recognized mode,
wherein the pattern used for the restoring comprises bits of the same number as the number of the pixel values, and the pattern embedded in the compressed data comprises at least one part of the bits.

25. The image restoring method of claim 24, further comprising performing the restoring the pixel values making up the block, as a first image compression technique, using the compressed data if the recognized mode indicates that the mode is an image compressed mode utilizing representative values of the pixel values and pattern data of the pixel values, and
wherein the restoring of the pixel values further comprises selectively restoring the pixel values according to at least a second image compression technique different from the first compression technique if the recognized mode indicates that the mode is not the image compressed mode utilizing the representative values of the pixel values and the pattern data of the pixel values.

* * * * *